(12) United States Patent
Zhang et al.

(10) Patent No.: US 11,799,630 B2
(45) Date of Patent: Oct. 24, 2023

(54) METHOD AND DEVICE FOR BLOCKCHAIN NODES

(71) Applicant: HEFEI DAPPWORKS TECHNOLOGY CO., LTD., Anhui (CN)

(72) Inventors: Yan Zhang, Anhui (CN); Yi Shi, Anhui (CN)

(73) Assignee: HEFEI DAPPWORKS TECHNOLOGY CO., LTD., Anhui (CN)

(*) Notice: Subject to any disclaimer, the term of this patent is extended or adjusted under 35 U.S.C. 154(b) by 480 days.

(21) Appl. No.: 17/053,583

(22) PCT Filed: May 9, 2018

(86) PCT No.: PCT/CN2018/086165
§ 371 (c)(1),
(2) Date: Nov. 6, 2020

(87) PCT Pub. No.: WO2019/213869
PCT Pub. Date: Nov. 14, 2019

(65) Prior Publication Data
US 2021/0233673 A1 Jul. 29, 2021

(51) Int. Cl.
*H04L 9/06* (2006.01)
*H04L 9/08* (2006.01)
(Continued)

(52) U.S. Cl.
CPC ............ *H04L 9/0643* (2013.01); *G16Y 30/10* (2020.01); *H04L 9/0825* (2013.01);
(Continued)

(58) Field of Classification Search
None
See application file for complete search history.

(56) References Cited

U.S. PATENT DOCUMENTS

| 10,057,243 B1* | 8/2018 | Kumar | H04L 9/321 |
| 2014/0096134 A1* | 4/2014 | Barak | G06F 21/566 |
| | | | 718/1 |
| 2018/0115586 A1* | 4/2018 | Chou | G06F 8/656 |

FOREIGN PATENT DOCUMENTS

| CN | 106686008 | 5/2017 |
| CN | 107005574 | 8/2017 |

(Continued)

OTHER PUBLICATIONS

Ding, S., et al., 2019. A novel attribute-based access control scheme using blockchain for IoT. IEEE Access, 7, pp. 38431-38441. (Year: 2019).*

(Continued)

*Primary Examiner* — Christopher J Brown
*Assistant Examiner* — Edward X Long
(74) *Attorney, Agent, or Firm* — Pillsbury Winthrop Shaw Pittman, LLP

(57) ABSTRACT

A method for blockchain nodes, the method including: sending security data of an Internet of Things system to other blockchain nodes, so that each blockchain node stores the security data in a blockchain database for that blockchain node; and obtaining one or more pieces of security data of the Internet of Things system from a blockchain database for a current blockchain node, and performing a corresponding operation on the Internet of Things system based on the obtained security data. There is also provided a device, a computer system and a computer readable medium for blockchain nodes.

15 Claims, 4 Drawing Sheets

(51) Int. Cl.
*G16Y 30/10* (2020.01)
*H04L 9/32* (2006.01)
*H04L 9/40* (2022.01)
*H04L 9/00* (2022.01)

(52) U.S. Cl.
CPC .............. *H04L 9/3247* (2013.01); *H04L 9/50* (2022.05); *H04L 63/1416* (2013.01)

(56) References Cited

FOREIGN PATENT DOCUMENTS

| | | |
|---|---|---|
| CN | 107181765 | 9/2017 |
| CN | 107395343 | 11/2017 |
| CN | 107682331 | 2/2018 |
| WO | 2017148245 | 9/2017 |

OTHER PUBLICATIONS

Alketbi, A., et al., Feb. 2018. Blockchain for government services—Use cases, security benefits and challenges. In 2018 15th Learning and Technology Conference (L&T) (pp. 112-119). IEEE. (Year: 2018).*

International Search Report and Written Opinion issued in PCT/CN2018/086165, dated Jan. 30, 2019.

European Extended Search Report issued in corresponding European Patent Application No. 18917855.1, dated Oct. 29, 2021.

Pinno, O.J.A et al.: "ControlChain: Blockchain as a Central Enabler for Access Control Authorizations in the IoT", IEEE Global, pp. 1-6 (Dec. 4, 2017).

Quaddah, A. et al.: "FairAccess: a new Blockchain-based access control framework for the Internet of Things", Security and Communication Networks, vol. 9, No. 18, pp. 5943-5964 (Dec. 1, 2016).

Novo, O.: "Blockchain Meets IoT: An Architecture for Scalable Access Management in IoT", IEEE Internet of Things Journal, vol. 5, No. 2, pp. 1184-1195 (Apr. 1, 2018).

* cited by examiner

METHOD AND DEVICE FOR BLOCKCHAIN NODES

This application is the U.S. national phase entry of PCT Patent Application No. PCT/CN2018/086165, filed May 9, 2018.

TECHNICAL FIELD

The present disclosure relates to the field of network technology, and more particularly, to a method and device for blockchain nodes.

BACKGROUND

The Internet of Things is a network that achieves interconnection of multiple ordinary objects having independent functions through information carriers such as Internet and traditional telecommunications networks. The Internet of Things digitizes the real world, closes scattered information, and integrates the digital information of things and things. The Internet of Things may be applied in fields such as transportation and logistics, health care, smart environment (home, office, factory), personal and social fields, etc., and has a very broad application prospect.

In the process of realizing the concept of the present disclosure, the inventor found that there are at least the following problems in the prior art: the security data in the Internet of Things system is subject to malicious tampering, causing security data to be non-trustable, and thus it is impossible to perform corresponding operations on the Internet of Things system based on the security data of the Internet of Things system.

SUMMARY

The present disclosure aims to solve the technical problems to improve the security effect of the Internet of Things system.

To solve the above technical problems, the embodiments of the present disclosure propose a method for blockchain nodes, comprising: sending security data of an Internet of Things system to other blockchain nodes, so that each blockchain node stores the security data in a blockchain database for said each blockchain node; and obtaining one or more pieces of security data of the Internet of Things system from a blockchain database for a current blockchain node, and performing a corresponding operation on the Internet of Things system based on the obtained security data.

Optionally, the security data of the Internet of Things system comprises a security rule and/or an operation log of a gateway device of the Internet of Things system; and sending the security data of the Internet of Things system to other blockchain nodes comprises: when the security rule of the gateway device of the Internet of Things system is set, sending the set security rule to other blockchain nodes, wherein the security rule comprises one or more sub-rules; and/or when the operation log is generated in the gateway device of the Internet of Things system, sending the generated operation log to other blockchain nodes.

Optionally, the method further comprises: encrypting the security data according to a preset encrypting rule to obtain the encrypted security data before sending the security data of the Internet of Things system to other blockchain nodes; wherein sending the security data of the Internet of Things system to other blockchain nodes comprises: sending the encrypted security data to other blockchain nodes, so that said each blockchain node stores the encrypted security data in the blockchain database for said each blockchain node.

Optionally, the method further comprises: generating a public key and a private key; and generating a digital signature based on the security data and the private key before sending the security data of the Internet of Things system to other blockchain nodes; wherein sending the security data of the Internet of Things system to other blockchain nodes comprises: sending the security data together with the digital signature for the security data and the public key to other blockchain nodes, so that said each blockchain node verifies the security data based on the digital signature and the public key, and stores the verified security data in the blockchain database for said each blockchain node.

Optionally, generating the digital signature based on the security data and the private key comprises: performing a hash calculation on a character string comprising the security data and the private key to obtain the digital signature.

Optionally, obtaining one or more pieces of security data of the Internet of Things system from the blockchain database for the current blockchain node, and performing the corresponding operation on the Internet of Things system based on the obtained security data comprises: obtaining a security rule initially set by the gateway device from the blockchain database for the current blockchain node; determining whether a local security rule of the gateway device is consistent with the obtained security rule; if the local security rule of the gateway device is consistent with the obtained security rule, it is determined that the local security rule of the gateway device has not been tampered with, so that the gateway device performs the corresponding operation on the Internet of Things system according to the local security rule; and if the local security rule of the gateway device is not consistent with the obtained security rule, it is determined that the local security rule of the gateway device has been tampered with, so that the gateway device performs the corresponding operation on the Internet of Things system according to the obtained security rule.

Optionally, obtaining one or more pieces of security data of the Internet of Things system from the blockchain database for the current blockchain node, and performing the corresponding operation on the Internet of Things system based on the obtained security data comprises: obtaining an operation log of the gateway device within a preset history time period from the blockchain database for the current blockchain node; determining whether a local operation log of the gateway device within the preset history time period is consistent with the obtained operation log; if the local operation log of the gateway device within the preset history time period is consistent with the obtained operation log, it is determined that the local operation log of the gateway device within the preset history time period has not been tampered with, so that the gateway device performs the corresponding operation on the Internet of Things system according to the local operation log; and if the local operation log of the gateway device within the preset history time period is not consistent with the obtained operation log, it is determined that the operation log of the gateway device within the preset history time period has been tampered with, so that the gateway device performs the corresponding operation on the Internet of Things system according to the obtained operation log.

Optionally, the operation log of the gateway device is an operation log of at least one of modifying, adding, and deleting the security rule; and obtaining one or more pieces of security data of the Internet of Things system from the blockchain database for the current blockchain node, and performing the corresponding operation on the Internet of Things system based on the obtained security data comprises: obtaining an operation log of the gateway device from the blockchain database for the current blockchain node; determining whether a local operation log of the gateway device is consistent with the obtained operation log; if the local operation log of the gateway device is consistent with the obtained operation log, it is determined that the local security rule and the operation log of the gateway device have not been tampered with, so that the gateway device performs the corresponding operation on the Internet of Things system according to the local security rule; and if the local operation log of the gateway device is not consistent with the obtained operation log, it is determined that the local security rule and the operation log of the gateway device have been tampered with, and obtain a non-tampered security rule according to a difference between the local operation log and the obtained operation log, so that the gateway device performs the corresponding operation on the Internet of Things system according to the non-tampered security rule.

Optionally, sending the security data of the Internet of Things system to other blockchain nodes, so that said each blockchain node stores the security data in the blockchain database for said each blockchain node comprises: sending the security data together with identification information of the gateway device to other blockchain nodes, so that said each blockchain node stores the security data and the identification information of the gateway device in the blockchain database for said each blockchain node; and obtaining one or more pieces of security data of the Internet of Things system from the blockchain database for a current blockchain node comprises: searching for and reading corresponding one or more pieces of security data of the identification information of the gateway device from the blockchain database for the current blockchain node according to the identification information of the gateway device.

Optionally, the current blockchain node is the gateway device of the Internet of Things system.

Optionally, the gateway device of the Internet of Things system is configured for performing at least one of local monitoring of the Internet of Things system, network protocol conversion of the Internet of Things system, and edge computing of the Internet of Things system.

The embodiments of the present disclosure further propose a method for blockchain nodes, comprising: receiving security data of an Internet of Things system sent by other blockchain nodes, verifying the security data with other blockchain nodes, and storing the verified security data in a blockchain database for each blockchain node.

Optionally, the security data of the Internet of Things system comprises: a security rule and/or an operation log of a gateway device of the Internet of Things system.

Optionally, the received security data is a security data encrypted according to a preset encrypting rule.

Optionally, receiving the security data of the Internet of Things system sent by other blockchain nodes further comprises: receiving a digital signature for the security data and a public key for a blockchain node sending the security data; wherein the digital signature for the security data is generated based on the security data and a private key for the blockchain node sending the security data; and verifying the security data with other blockchain nodes, and storing the verified security data in the blockchain database for said each blockchain node comprises: verifying the security data based on the digital signature for the security data and the public key for the blockchain node sending the security data, and storing the verified security data in the blockchain database for said each blockchain node.

Optionally, receiving the security data of the Internet of Things system sent by other blockchain nodes further comprises: receiving identification information of the gateway device for the security data; and verifying the security data with other blockchain nodes, and storing the verified security data in the blockchain database for said each blockchain node comprises: verifying the security data with other blockchain nodes, and storing the verified security data and the identification information of the gateway device of the security device in the blockchain database for said each blockchain node.

Optionally, the current blockchain node comprises: the gateway device of the Internet of Things system.

Optionally, the gateway device of the Internet of Things system is configured for performing at least one of local monitoring of the Internet of Things system, network protocol conversion of the Internet of Things system, and edge computing of the Internet of Things system.

The embodiments of the present disclosure further propose a device for blockchain nodes, comprising: a sending module, configured to send security data of an Internet of Things system to other blockchain nodes, so that each blockchain node stores the security data in a blockchain database for said each blockchain node; and a security module, configured to obtain one or more pieces of security data of the Internet of Things system from a blockchain database for a current blockchain node, and perform a corresponding operation on the Internet of Things system based on the obtained security data.

Optionally, the security data of the Internet of Things system comprises a security rule and/or an operation log of a gateway device of the Internet of Things system; and the sending module is configured to when the security rule of the gateway device of the Internet of Things system is set, send the set security rule to other blockchain nodes, wherein the security rule comprises one or more sub-rules; and/or when the operation log is generated in the gateway device of the Internet of Things system, send the generated operation log to other blockchain nodes.

Optionally, the device further comprises: an encrypting module. The encrypting module is configured to encrypt the security data according to a preset encrypting rule to obtain the encrypted security data; wherein the sending module is configured to send the encrypted security data to other blockchain nodes, so that said each blockchain node stores the encrypted security data in the blockchain database for said each blockchain node.

Optionally, the device further comprises: a signature module. The signature module is configured to generate a public key and a private key; and generate a digital signature based on the security data and the private key before sending the security data of the Internet of Things system to other blockchain nodes; wherein the sending module is configured to send the security data together with the digital signature for the security data, and the public key to other blockchain nodes, so that said each blockchain node verifies the security data based on the digital signature and the public key, and stores the verified security data in the blockchain database for said each blockchain node.

Optionally, the signature module is configured to perform a hash calculation on a character string comprising the security data and the private key to obtain the digital signature.

Optionally, the security module is configured to obtain a security rule initially set by the gateway device from the blockchain database for the current blockchain node; and determine whether a local security rule of the gateway device is consistent with the obtained security rule; if the local security rule of the gateway device is consistent with the obtained security rule, determine that the local security rule of the gateway device has not been tampered with, so that the gateway device performs the corresponding operation on the Internet of Things system according to the local security rule; and if the local security rule of the gateway device is not consistent with the obtained security rule, determine that the local security rule of the gateway device has been tampered with, so that the gateway device performs the corresponding operation on the Internet of Things system according to the obtained security rule.

Optionally, the security module is configured to obtain an operation log of the gateway device within a preset history time period from the blockchain database for the current blockchain node; determine whether a local operation log of the gateway device within the preset history time period is consistent with the obtained operation log; if the local operation log of the gateway device within the preset history time period is consistent with the obtained operation log, determine that the local operation log of the gateway device within the preset history time period has not been tampered with, so that the gateway device performs the corresponding operation on the Internet of Things system according to the local operation log; and if the local operation log of the gateway device within the preset history time period is not consistent with the obtained operation log determine that the operation log of the gateway device within the preset history time period has been tampered with, so that the gateway device performs the corresponding operation on the Internet of Things system according to the obtained operation log.

Optionally, the operation log of the gateway device is an operation log of at least one of modifying, adding, and deleting the security rule; and the security module is configured to obtain an operation log of the gateway device from the blockchain database for the current blockchain node; determine whether a local operation log of the gateway device is consistent with the obtained operation log; if the local operation log of the gateway device is consistent with the obtained operation log, determine that the local security rule and the operation log of the gateway device have not been tampered with, so that the gateway device performs the corresponding operation on the Internet of Things system according to the local security rule; and if the local operation log of the gateway device is not consistent with the obtained operation log, determine that the local security rule and the operation log of the gateway device have been tampered with, and obtaining a non-tampered security rule according to a difference between the local operation log and the obtained operation log, so that the gateway device performs the corresponding operation on the Internet of Things system according to the non-tampered security rule.

Optionally, the sending module is further configured to send the security data together with identification information of the gateway device to other blockchain nodes, so that said each blockchain node stores the security data and the identification information of the gateway device in the blockchain database for said each blockchain node; and the security module is configured to search and read corresponding one or more pieces of security data of the identification information of the gateway device from the blockchain database for the current blockchain node according to the identification information of the gateway device.

Optionally, the current blockchain node comprises: the gateway device of the Internet of Things system.

Optionally, the gateway device of the Internet of Things system is configured for performing at least one of local monitoring of the Internet of Things system, network protocol conversion of the Internet of Things system, and edge computing of the Internet of Things system.

The embodiments of the present disclosure further propose a device for blockchain nodes, comprising: a receiving module, configured to receive security data of an Internet of Things system sent by other blockchain nodes; a verifying module, configured to verify the security data with other blockchain nodes; and a storing module, configured to store the verified security data in an blockchain database for each blockchain node.

Optionally, the security data of the Internet of Things system comprises: a security rule and/or an operation log of a gateway device of the Internet of Things system.

Optionally, the received security data is a security data encrypted according to a preset encrypting rule.

Optionally, the receiving module is further configured to receive a digital signature for the security data together with a public key for a blockchain node sending the security data; wherein the digital signature for the security data is generated based on the security data and a private key for the blockchain node sending the security data; and the verifying module is configured to verify the security data based on the digital signature and the public key.

Optionally, the receiving module is further configured to receive identification information of the gateway device for the security data; and the storing module is configured to store the verified security data and the identification information of the gateway device of the security device in the blockchain database for said each blockchain node.

Optionally, the current blockchain node comprises: the gateway device of the Internet of Things system.

Optionally, the gateway device of the Internet of Things system is configured for performing at least one of local monitoring of the Internet of Things system, network protocol conversion of the Internet of Things system, and edge computing of the Internet of Things system.

The embodiments of the present disclosure further propose a computer system, comprising a memory, a processor, and a computer program stored on the memory and running on the processor, wherein the processor, when executing the program implements the method described above, and/or the method described above.

The embodiments of the present disclosure further propose a computer readable medium, storing executable instructions thereon, wherein the instructions, when executed by a processor, cause the processor to execute the method described above and/or the method described above.

Compared with the prior art, the technical solution of the embodiments of the present disclosure has the following beneficial effects.

In the embodiments of the present disclosure, the security data generated by the Internet of Things system is stored in the blockchain database. With the non-tamperable characteristics of the data in the blockchain database, the security data generated by the Internet of Things system may be truthfully recorded to reflect the actual operating status of the Internet of Things system, the corresponding security data may be obtained from the blockchain database as needed, and based on the obtained security data, the Internet of Things system may be operated in accordance with the actual operating status of the Internet of Things system. This realizes the traceability of the actual operation of the Internet of Things system, achieving a more effective protection on the security of the Internet of Things system.

BRIEF DESCRIPTION OF THE ACCOMPANYING DRAWINGS

The above and additional objectives, features and advantages of the present disclosure will become more obvious from the following description of the embodiments in conjunction with the accompanying drawings, in which.

DETAILED DESCRIPTION

Embodiments of the present disclosure will be described with reference to the drawings below. However, it should be understood that the description is only exemplary and not intended to limit the scope of the present disclosure. In the following detailed description, for ease of explanation, many specific details are set forth to propose a comprehensive understanding of the embodiments of the present disclosure. However, obviously, one or more embodiments may also be implemented without these specific details. In addition, in the following description, descriptions of well-known structures and technologies are omitted to avoid unnecessarily obscuring the concept of the present disclosure.

The terms used here are only for describing specific embodiments, and are not intended to limit the present disclosure. The terms "comprising", "including", etc. used herein indicate the existence of the described features, steps, operations and/or components, but do not exclude the presence or addition of one or more other features, steps, operations or components.

All terms used herein (including technical and scientific terms) have meanings commonly understood by those skilled in the art, unless otherwise defined. It should be noted that the terms used herein should be interpreted as having meanings consistent with the context of this description, and should not be explained in an idealized or overly rigid manner.

In the case of using an expression similar to "at least one of A, B, C, etc.", it should be generally interpreted according to the meaning of the expression commonly understood by those skilled in the art (for example, "a system with at least one of A, B and C" should comprise but is not limited to systems with A alone, B alone, C alone, A and B, A and C, B and C, and/or a system with A, B, C, etc.). In the case of using an expression similar to "at least one of A, B, or C, etc.", it should be generally interpreted according to the meaning of the expression commonly understood by those skilled in the art (for example, "a system with at least one of A, B or C" should comprise but is not limited to systems with A alone, B alone, C alone, A and B, A and C, B and C, and/or a system with A, B, C, etc.). Those skilled in the art should also understand that essentially any transitional conjunctions and/or phrases representing two or more optional items, whether in the description, claims or drawings, should be understood to comprise the possibilities of one of these items, any of these items, or two items. For example, the phrase "A or B" should be understood to comprise the possibilities of "A" or "B", or "A and B."

In order to make the above objectives, features and beneficial effects of the present disclosure more obvious and understandable, specific embodiments of the present disclosure will be described in detail below with reference to the accompanying drawings.

Figure 1:
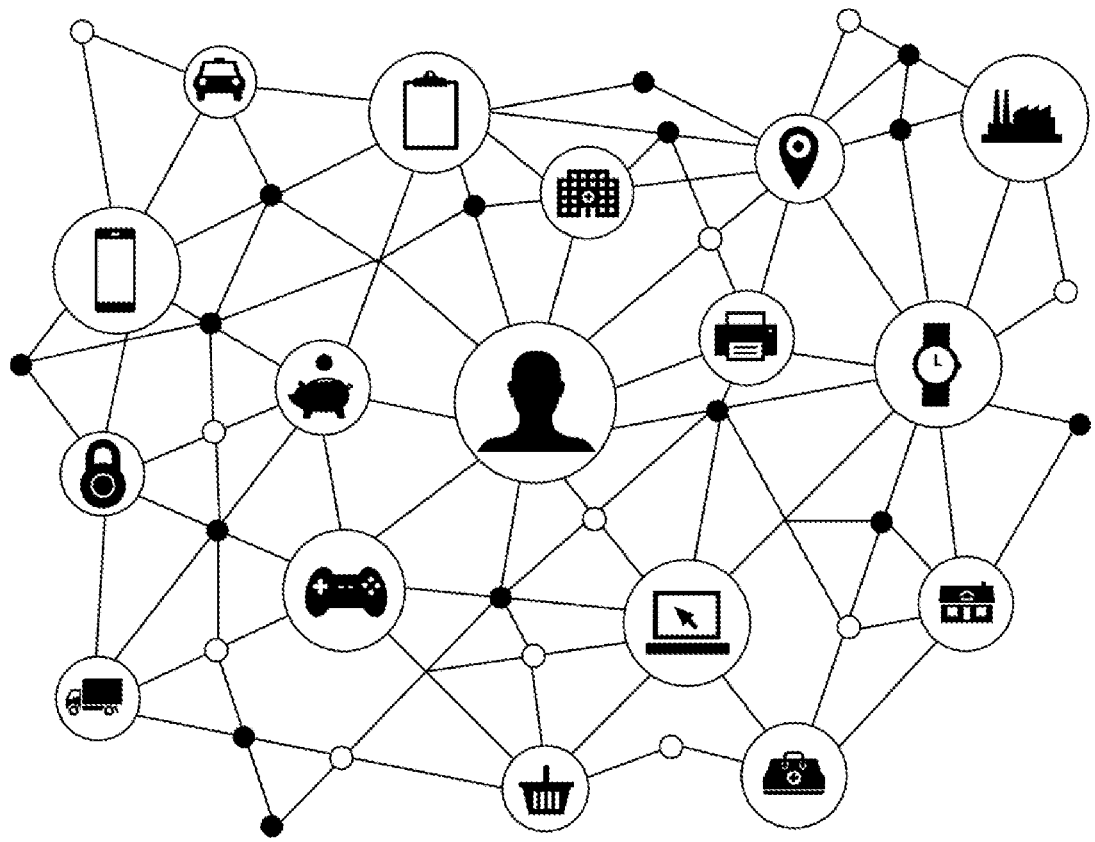
FIG. 1 shows a schematic system architecture of a method and a device which may be applied for blockchain nodes according to an embodiment of the present disclosure.

FIG. 1 shows a schematic system architecture of a method and a device which may be applied for blockchain nodes according to an embodiment of the present disclosure. It should be noted that FIG. 1 is only an example of a system architecture which may be applied for the embodiment of the present disclosure to help those skilled in the art understand the technical content of the present disclosure, but it does not mean that the embodiment of the present disclosure cannot be used for other devices, systems, environments or scenarios.

As shown in FIG. 1, the system architecture of the embodiment shows an Internet of Things system. The Internet of Things system is a network achieving interconnection of multiple ordinary objects having independent functions through information carriers such as Internet and traditional telecommunication networks, wherein each node corresponds to a device connected into the Internet of Things. As shown in FIG. 1, the device may be a mobile terminal, a car, a home device, etc. The Internet of Things system may centrally manage and control machines and devices, remotely control home devices and cars, search for locations, and prevent misjudgments and theft, etc., to achieve similar automated control systems, data collected from each node in the Internet of Things system may be aggregated into Big Data, and a corresponding design, update, prediction, control, etc. may be carried out based on Big Data, in order to realize the interconnection of things.

It should be understood that the number of nodes in the Internet of Things system shown in FIG. 1 is only illustrative. The embodiment of the present disclosure may be applied to an Internet of Things system of any scale having any number of nodes as desired.

Figure 2:
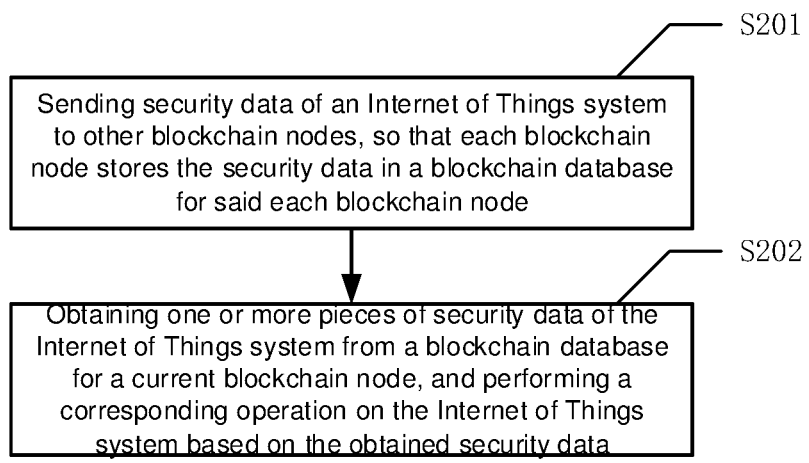
FIG. 2 shows a schematic flowchart of a method for blockchain nodes according to an embodiment of the present disclosure.

FIG. 2 shows a schematic flowchart of a method for blockchain nodes according to an embodiment of the present disclosure, wherein the method is described from a perspective of a blockchain node sending security data of an Internet of Things system, which may specifically comprise the following steps.

At step S201, security data of an Internet of Things system is sent to other blockchain nodes, so that each blockchain node stores the security data in a blockchain database for said each blockchain node.

At step S202, one or more pieces of security data of the Internet of Things system is obtained from a blockchain database for a current blockchain node, and a corresponding operation is performed on the Internet of Things system based on the obtained security data.

It may be seen that the method shown in FIG. 2 utilizes the non-tamperable characteristics of the data in the blockchain database to store the security data generated by the Internet of Things system in the blockchain database, so that the security data generated by the Internet of Things system may be truthfully recorded to reflect the actual operating status of the Internet of Things system, and the corresponding security data may be obtained from the blockchain database as needed. Based on the obtained security data, the Internet of Things system may be operated in accordance with the actual operating status of the Internet of Things system. The solution realizes the traceability of the actual operation of the Internet of Things system, and may protect the security of the Internet of Things system more effectively.

In an embodiment of the present disclosure, the method shown in FIG. 2 further comprises: before sending the security data of the Internet of Things system to other blockchain nodes, encrypting the security data according to a preset encrypting rule to obtain the encrypted security data. Step S201 of sending security data of an Internet of Things system to other blockchain nodes comprises: sending the encrypted security data to other blockchain nodes, so that said each blockchain node stores the encrypted security data in the blockchain database for said each blockchain node.

The embodiment may be implemented in the following manner. For example, after security data A is generated by the Internet of Things system, a copy of the security data A is stored locally, encrypt the security data A, generate an encrypting key and a decrypting key according to a preset encrypting rule, use the encrypting key to encrypt the security data A and obtain encrypted security data A, send the encrypted security data A and identification information A to other blockchain nodes, and each blockchain node may store the encrypted security data A and the identification Information A into a blockchain database for each blockchain node. When the security data A needs to be used, obtain the encrypted security data A from the blockchain database for the current blockchain node according to the identification information A, and decrypt the encrypted security data A with the decryption key to obtain the security data A. Since the decrypted security data A is ensured to be non-tampered, it is possible to verify whether the security data A stored locally has been tampered with by using the decrypted security data A, and a corresponding operation may be performed on the Internet of Things system based on the descripted security data A.

As another example, after security data A is generated by the Internet of Things system, a copy of the security data A is stored locally, and the security data A is encrypted. The preset encrypting rule is a hash algorithm, such as MD5 algorithm, SHA256 algorithm, and national secret algorithms, etc.. Use the hash algorithm to calculate a hash value of the security data A, send the hash value of the security data A and identification information A to other blockchain nodes. Each blockchain node may store the hash value of the security data A and the identification information A into the blockchain database for the blockchain node. When the security data A needs to be used, the hash value of the security data A is obtained from the blockchain database for the current blockchain node according to the identification information A, and a verification may be performed to determine whether the locally stored security data has been tampered with by using the hash value of the obtained security data A. When it is determined that the locally stored security data A has not been tampered with, a corresponding operation may be performed on the Internet of Things system based on the locally stored security data A.

Through the above embodiment, the security data of the Internet of Things system is ensured to be not tampered with by using the multi-party supervision feature of the blockchain database, while the privacy of the security data of the Internet of Things system stored in the blockchain database is ensured by encrypting the security data of the Internet of Things system.

In order to further ensure the authenticity of the security data stored in the blockchain database, in an embodiment of the present disclosure, a digital signature is added to the security data through an asymmetric encrypting method. Specifically, the method shown in FIG. 2 further comprises: generating a public key and a private key; and generating a digital signature based on the security data and the private key before sending the security data of the Internet of Things system to other blockchain nodes. Step S201 of sending security data of an Internet of Things system to other blockchain nodes comprises: sending the security data together with the digital signature for the security data and the public key to other blockchain nodes, so that said each blockchain node verifies the security data based on the digital signature and the public key, and stores the verified security data in the blockchain database for said each blockchain node.

Specifically, the above described generating the digital signature based on the security data and the private key comprises: performing a hash calculation on a character string comprising the security data and the private key to obtain the digital signature; then send the digital signature, the public key, and the security data to each blockchain node, each blockchain node uses the corresponding public key and digital signature to determine whether the source of the security data is reliable and whether it has been tampered with, and the security data may be stored into the blockchain database if the security data has no problem. Alternatively, it is possible to calculate hash value of the security data, and perform a hash calculation on a character string comprising the security data and the private key again to obtain the digital signature; then send the digital signature, the public key, and the security data to each blockchain node respectively, each blockchain node uses the corresponding public key and digital signature to determine whether the source of the hash value of the security data is reliable and whether it has been tampered, it may be stored into the blockchain database if the security data has no problem. Alternatively, it is possible to encrypt the security data to obtain the encrypted security data, and then perform a hash calculation on the string comprising the encrypted security data and the private key again to obtain the digital signature; then send the digital signature, the public key and the encrypted security data to each blockchain node respectively, each blockchain node uses the corresponding public key and digital signature to determine whether the source of the encrypted security data is reliable and whether it has been tampered with in the middle, it may be stored into the blockchain database if the blockchain database has no problem.

In the current Internet of Things system, gateway devices play a very important role. A gateway device of the Internet of Things system may realize protocol conversion between perception networks and communication networks, and between different types of perception networks, and may realize both wide-area interconnection and local-area interconnection. In addition, the gateway device of the Internet of Things system may have a device management function, wherein the device management function may manage each underlying Internet of Things node, have knowledge of the relevant information of each Internet of Things node, and realize remote control through the gateway device. Furthermore, the gateway device of the Internet of Things system may have an edge computing capability specific to the Internet of Things to achieve faster and more accurate data collection and transmission in the Internet of Things. Therefore, in an embodiment of the present disclosure, the gateway device of the Internet of Things system may act as the current blockchain node to perform the above steps S201-S202, or the current blockchain node may interact with the gateway device of the Internet of Things system, obtain the security data of the Internet of Things system from the gateway device of the Internet of Things system to perform the above steps S201-S202. In this case, the security data of the Internet of Things system comprises a security rule and/or an operation log of a gateway device of the Internet of Things system. Step S201 of sending security data of an Internet of Things system to other blockchain nodes comprises: when the security rule of the gateway device of the Internet of Things system is set, sending the set security rule to other blockchain nodes, and each blockchain node stores the set security rule into a blockchain database for the blockchain node; and/or when the operation log is generated in the gateway device of the Internet of Things system, sending the generated operation log to other blockchain nodes, and each blockchain node stores the operation log into a blockchain database for the blockchain node.

Specifically, the security rule of the gateway device of the Internet of Things system refers to the entire security rule stored in the gateway device of the Internet of Things system, and the security rule comprises one or more sub-rules. Setting the security rule of the gateway device of the Internet of Things system may comprise one or more of: adding one or more new sub-rules to the existing security rule, deleting one or more sub-rules from the existing security rule, and modifying one or more sub-rules in the existing security rule. After setting the security rule of the gateway device of the Internet of Things system, one or more set sub-rules are obtained, and the set security rule is composed of the one or more set sub-rules. Whenever the security rule of the gateway device of the Internet of Things system changes, the security rule in the gateway device is stored as a whole into the blockchain database. The gateway device of the Internet of Things system generates a corresponding operation log when it performs an operation. Whenever the gateway device of the Internet of Things system generates an operation log, the gateway device of the Internet of Things system stores the operation log into the blockchain database. It can be seen that, in the embodiment, each security rule set in history in the gateway device of the Internet of Things system and each operation log generated in the history are recorded in the blockchain database.

Wherein, the gateway device of the Internet of Things system has at least one of the following functions: local monitoring of the Internet of Things system, network protocol conversion of the Internet of Things system, and edge computing of the Internet of Things system.

In the current Internet of Things system, a local Internet of Things system is connected to the Internet through a gateway device. The security of the entire Internet of Things system is monitored by the gateway device. Generally, security monitoring is performed in a manner as described in the following. The gateway device has a security rule which is set locally in the gateway device. The gateway device locally records an operation log of an operation performed in the Internet of Things system. When an operation occurs in the Internet of Things system, it is determined whether the operation is legal according to the security rule. If the operation is not legal, the operator of the Internet of Things system is alerted, and the operator locate the illegal operation in the Internet of Things system by checking the operation log, thereby making a corresponding treatment. For example, a gateway device monitors the operation of applications running in the Internet of Things system, the operation of access devices in the Internet of Things system, etc. The gateway device locally pre-stores a whitelist or blacklist pre-defined by the operator of the Internet of Things system as a security rule. When the gateway device detects that an application not defined in the whitelist is intended to run in the Internet of Things system, or a device not defined in the whitelist is intended to access the Internet of Things system, the gateway device warns the operator immediately. Alternatively, when the gateway device detects that an application defined in the blacklist is intended to run in the Internet of Things system, or a device defined in the blacklist is intended to run or access the Internet of Things system, the gateway device prohibits the application or the device or sends an alarm according to a preset rule, so that the operator can make corresponding treatments immediately for different situations according to the events that appear in the operation log. The problem related to this solution is that the security rules stored locally in the gateway device may be maliciously reset, the operation log recorded locally by the gateway device may also be maliciously added, deleted or modified, and in the case of the security rules and/or operation rules untrustworthy, security monitoring of the Internet of Things system becomes meaningless.

The solution proposed by the present disclosure can effectively solve the above problems. In an embodiment of the present disclosure, the security rule and the operation log in the gateway device of the Internet of Things system are stored in the blockchain database. For each set security rule, regardless of it is set by the operator or maliciously, the set security rule is stored in the blockchain database. For each generated operation log, regardless of it is a legal operation log or an illegal operation log, the operation log is stored in the blockchain database. Due to the non-tampering characteristics of the data in the blockchain database, each historical security rule of the gateway device recorded in the blockchain database may reflect all the settings experienced by the security rule, and the operation log recorded in the blockchain database may reflect all the operations experienced by the Internet of Things system, such that correct operations may be performed on the Internet of Things system based on the security data of the Internet of Things system recorded in the blockchain database.

Specifically, in an embodiment of the present disclosure, when the operator of the Internet of Things system initially sets the security rule of the gateway device, the initially set security rule is sent to other blockchain nodes, and other blockchain nodes store the initially set security rule in the blockchain database for each blockchain node via consensus verification. Step S202 of obtaining one or more pieces of security data of the Internet of Things system from a blockchain database for a current blockchain node, and performing a corresponding operation on the Internet of Things system based on the obtained security data comprises: obtaining a security rule initially set by the gateway device from the blockchain database for the current blockchain node; determining whether a local security rule of the gateway device is consistent with the obtained security rule; if the local security rule of the gateway device is consistent with the obtained security rule, it is determined that the local security rule of the gateway device has not been tampered with, so that the gateway device performs the corresponding operation on the Internet of Things system according to the local security rule; and if the local security rule of the gateway device is not consistent with the obtained security rule, it is determined that the local security rule of the gateway device has been tampered with, so that the gateway device performs the corresponding operation on the Internet of Things system according to the obtained security rule.

The embodiment is applicable to a situation where the security rule of the gateway device remain unchanged from the initially set security rule under a normal operation of the Internet of Things system. For a gateway device A, only an initially set security rule of the gateway device A is recorded in the blockchain database in normal state. When the security rule stored locally by the gateway device A is different from the initially set security rule of the gateway device A recorded in the blockchain database, it means that the security rule stored locally by the gateway device A is no longer the security rule initially set by the operator, that is, the local security rule of the gateway device A has been maliciously tampered with. Furthermore, compare the difference between the security rule locally stored in the gateway device A and the initially set security rule of the gateway device A recorded in the blockchain database. Through the difference, it is possible to determine which parts of the malicious tampering have been tampered with, i.e. the malicious behaviors of the malicious tampering may be determined, and these malicious behaviors may be prohibited and prevented.

In another embodiment of the present disclosure, each time the gateway device of the Internet of Things system generates an operation log, the gateway device of the Internet of Things system may send the generated operation log to other blockchain nodes, so that other blockchains store the operation log into the blockchain database for each blockchain, wherein each operation log records time information, operation mode, and operation object. Step S202 of obtaining one or more pieces of security data of the Internet of Things system from a blockchain database for a current blockchain node, and performing a corresponding operation on the Internet of Things system based on the obtained security data comprises: obtaining an operation log of the gateway device within a preset history time period from the blockchain database for the current blockchain node; determining whether a local operation log of the gateway device within the preset history time period is consistent with the obtained operation log; if the local operation log of the gateway device within the preset history time period is consistent with the obtained operation log, it is determined that the local operation log of the gateway device within the preset history time period has not been tampered with, so that the gateway device performs the corresponding operation on the Internet of Things system according to the local operation log; and if the local operation log of the gateway device within the preset history time period is not consistent with the obtained operation log, it is determined that the operation log of the gateway device within the preset history time period has been tampered with, so that the gateway device performs the corresponding operation on the Internet of Things system according to the obtained operation log.

More specifically, the operation log of the gateway device is an operation log of at least one of modifying, adding, and deleting the security rule. Each operation log comprises: operation time, operation mode, and operation object, wherein the operation time refers to the time related to the operation, the operation mode comprises modifying, adding, and/or deleting, and the operation object refers to the security rule content of the operation. Whenever the security rule in the gateway device is modified, added, and/or deleted, regardless of the operation is legal or malicious, the operation log of the operation is stored in the blockchain database through multiple blockchain nodes. Step S202 of obtaining one or more pieces of security data of the Internet of Things system from a blockchain database for a current blockchain node, and performing a corresponding operation on the Internet of Things system based on the obtained security data comprises: obtaining an operation log of the gateway device from the blockchain database for the current blockchain node; determining whether a local operation log of the gateway device is consistent with the obtained operation log; if the local operation log of the gateway device is consistent with the obtained operation log, it is determined that the local security rule and the operation log of the gateway device have not been tampered with, so that the gateway device performs the corresponding operation on the Internet of Things system according to the local security rule; and if the local operation log of the gateway device is not consistent with the obtained operation log, it is determined that the local security rule and the operation log of the gateway device have been tampered with, and obtain a non-tampered security rule according to a difference between the local operation log and the obtained operation log, so that the gateway device performs the corresponding operation on the Internet of Things system according to the non-tampered security rule.

In each of the above embodiments, sending the security data of the Internet of Things system to other blockchain nodes, so that said each blockchain node stores the security data in the blockchain database for said each blockchain node comprises: sending the security data together with identification information of the gateway device to other blockchain nodes, so that said each blockchain node stores the security data and the identification information of the gateway device in the blockchain database for said each blockchain node. Obtaining one or more pieces of security data of the Internet of Things system from the blockchain database for a current blockchain node comprises: searching for and reading corresponding one or more pieces of security data of the identification information of the gateway device from the blockchain database for the current blockchain node according to the identification information of the gateway device.

Figure 3:
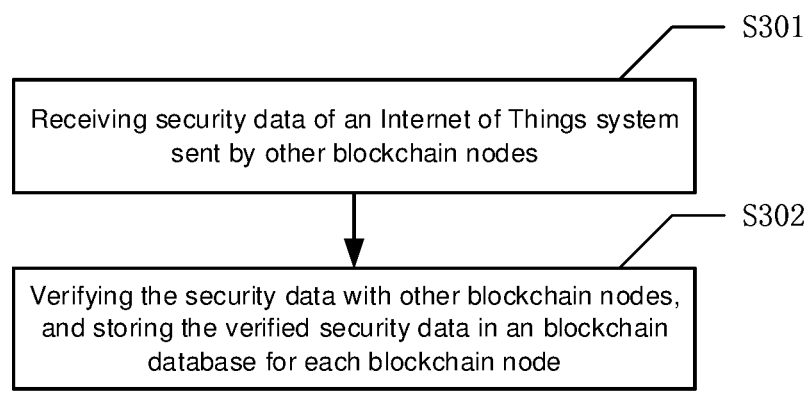
FIG. 3 shows a schematic flowchart of a method for blockchain nodes according to another embodiment of the present disclosure.

FIG. 3 shows a schematic flowchart of a method for blockchain nodes according to another embodiment of the present disclosure, wherein the method is described from a perspective of the blockchain node receiving security data of an Internet of Things system, which may specifically comprise the following steps.

Step S301, security data of an Internet of Things system sent by other blockchain nodes is received.

Step S302, the security data is verified with other blockchain nodes, and the verified security data is stored in a blockchain database for each blockchain node.

As blockchain uses a distributed ledger to record all data, blockchain is characterized in that the historical records cannot be tampered with, that is, once the data is recorded on the chain, the data may be stored forever. Blockchain uses a decentralized distributed system. Each device running the blockchain is an independent server keeping an independent ledger. The data in the ledger uses a blockchain structure to ensure that historical data cannot be tampered with. It may be seen that with the non-tamperable characteristics of the data in the blockchain database, the method shown in FIG. 3 stores the security data generated by the Internet of Things system in the blockchain database, so that the security data generated by the Internet of Things system may be recorded faithfully to reflect the actual operating status of the Internet of Things system, and the security data may be obtained from the blockchain database as desired. In this manner, the actual operation of the Internet of Things system may be traced back, and the security of the Internet of Things system may be protected more effectively.

In the current Internet of Things system, a gateway device plays a very important role. A gateway device of the Internet of Things system may realize protocol conversion between perception networks and communication networks, and between different types of perception networks, and may realize both wide-area interconnection and local-area interconnection. In addition, the gateway device of the Internet of Things system may have a device management function, wherein the gateway device may manage each underlying Internet of Things node, understand the relevant information of each Internet of Things node, and realize remote control through the gateway device. Furthermore, the gateway device of the Internet of Things system may have an edge computing capability specific to the Internet of Things to achieve faster and more accurate data collection and transmission in the Internet of Things. Therefore, in an embodiment of the present disclosure, the security data of the Internet of Things system comprises: a security rule and/or an operation log of a gateway device of the Internet of Things system. When the security rule of the gateway device of the Internet of Things system is set, receive security data of an Internet of Things system sent by corresponding blockchain nodes, verify the security data with other blockchain nodes, and store verified security data in an blockchain database for each blockchain node; and/or when the operation log is generated in the gateway device of the Internet of Things system, send the generated operation log to other blockchain nodes, and each blockchain node stores the operation log in the blockchain database for each blockchain node.

It can be seen that, in the embodiment of the present disclosure, the security rule and the operation log in the gateway device of the Internet of Things system are stored in the blockchain database. For each set security rule, regardless of it is set by the operator or maliciously, the set security rule is stored in the blockchain database. For each generated operation log, regardless of it is a legal operation log or an illegal operation log, the operation log is stored in the blockchain database. Due to the non-tampering characteristics of the data in the blockchain database, each historical security rule of the gateway device recorded in the blockchain database may reflect all the settings experienced by the security rule, and the operation log recorded in the blockchain database may reflect all the operations experienced by the Internet of Things system, such that correct operations may be performed on the Internet of Things system based on the security data of the Internet of Things system recorded in the blockchain database.

In an embodiment of the present disclosure, when the security data of the Internet of Things system comprises a security rule and/or an operation log of a gateway device of the Internet of Things system, step S301 of receiving security data of an Internet of Things system sent by other blockchain nodes further comprises receiving identification information of the gateway device for the security data. Step S302 of verifying the security data with other blockchain nodes, and storing the verified security data in a blockchain database for each blockchain node comprises: verifying the security data with other blockchain nodes, and storing the verified security data and the identification information of the gateway device of the security device in the blockchain database for said each blockchain node. In this way, when the security data needs to be obtained from the blockchain database, the corresponding security data may be found according to the identification information of the gateway device.

In an embodiment of the present disclosure, when the received security data of the Internet of Things system from other blockchain nodes comprises a security rule and/or an operation log of a gateway device of the Internet of Things system, the current blockchain node may also be the gateway device of the Internet of Things system. In other words, one or more blockchain nodes in the blockchain network in the embodiment may be gateway devices of the Internet of Things system, which are used to maintain the security of one or more Internet of Things systems through blockchain. When multiple blockchain nodes are gateway devices of the Internet of Things system, i.e. when multiple gateway devices jointly maintains the blockchain network, a consensus of multiple blockchain nodes according to the requirements of the common Internet of Things system security monitoring of the gateway devices is made to jointly maintain the security of various Internet of Things systems. Alternatively, when the blockchain node is not the gateway device of the Internet of Things system, in other words when the blockchain node may interact with the gateway device, the blockchain technology may also be used to maintain the security of the Internet of Things system.

Wherein, the gateway device of the Internet of Things system is capable of performing at least one of local monitoring of the Internet of Things system, network protocol conversion of the Internet of Things system, and edge computing of the Internet of Things system.

In an embodiment of the present disclosure, the received security data is a security data encrypted according to a preset encrypting rule. The embodiment may be implemented in the following manner. For example, after security data A is generated by the Internet of Things system, a copy of the security data A is stored locally. The security data A is encrypted. An encrypting key and a decryption key are generated according to a preset encrypting rule. The security data A is encrypted by using the encrypting key to obtain encrypted security data A. The encrypted security data A and identification information A sent from corresponding blockchain nodes are received, and each blockchain node may store the encrypted security data A and the identification Information A into a blockchain database for said each blockchain node after consensus verification. When the security data A is required by a corresponding blockchain node, the corresponding blockchain node obtains the encrypted security data A from the blockchain database for the corresponding blockchain node according to the identification information A, and decrypt the encrypted security data A with the decryption key to obtain the security data A. The security data A is ensured to be non-tampered. It is possible to verify whether the security data A stored locally has been tampered with by using the decrypted security data A and a corresponding operation may be performed on the Internet of Things system based on the decrypted security data A.

As another example, after security data A is generated by the Internet of Things system, a copy of the security data A is stored locally, and the security data A is encrypted. The preset encrypting rule is a hash algorithm, such as MD5 algorithm, SHA256 algorithm, and national secret algorithms, etc. The hash algorithm may be used to calculate a hash value of the security data A. The hash value of the security data A and the identification information A send from corresponding blockchain nodes are received, and each blockchain node may store the hash value of the security data A and the identification information A into the blockchain database for said each blockchain node. When the security data A is required by a corresponding blockchain node, the hash value of the security data A is obtained from the blockchain database for the corresponding blockchain node according to the identification information A. It is determined that whether the locally stored security data has been tampered with by using the hash value of the obtained security data A. When it is determined that the locally stored security data A has not been tampered with, a corresponding operation may be performed on the Internet of Things system based on the locally stored security data A.

In the above embodiment, a characteristic of multi-party supervision for the blockchain database is utilized to ensure that the security data of the Internet of Things system is not tampered with, while the privacy of the security data of the Internet of Things system stored in the blockchain database is ensured through encrypting the security data of the Internet of Things system.

In an embodiment of the present disclosure, step S301 of receiving security data of an Internet of Things system sent by other blockchain nodes further comprises: receiving a digital signature for the security data and a public key of a blockchain node sending the security data; wherein the digital signature for the security data is generated based on the security data and a private key of the blockchain node sending the security data. Step S302 of verifying the security data with other blockchain nodes, and storing the verified security data in an blockchain database for each blockchain node comprises: verifying the security data with other blockchain nodes, and storing the verified security data in the blockchain database for each blockchain node comprises: verifying the security data based on the digital signature for the security data and the public key of the blockchain node sending the security data, and storing the verified security data in the blockchain database for each blockchain node.

Specifically, generating the digital signature based on the security data and the private key comprises: performing a hash calculation on a character string comprising the security data and the private key to obtain the digital signature. After receiving the digital signature, the public key and the hash value of the security data, determine whether the source of the security data is reliable and whether it has been tampered with based on the corresponding public key and digital signature, the verification is passed if there is no problem. Alternatively, calculate the hash value of the security data, and perform a hash calculation on a character string comprising the security data and the private key again to obtain the digital signature. After receiving the digital signature, the public key and the hash value of the security data, it is determined that whether the source of the security data is reliable and whether the security data has been tampered with based on the corresponding public key and digital signature, and the verification is passed if the security data has no problem. Alternatively, encrypt the security data to obtain the encrypted security data, and then perform a hash calculation on the string comprising the encrypted security data and the private key again to obtain the digital signature. After receiving the digital signature, the public key and the hash value of the security data, it is determined that whether the source of the security data is reliable and whether the security data has been tampered with based on the corresponding public key and digital signature, the verification is passed if the security data has no problem.

Figure 4A:
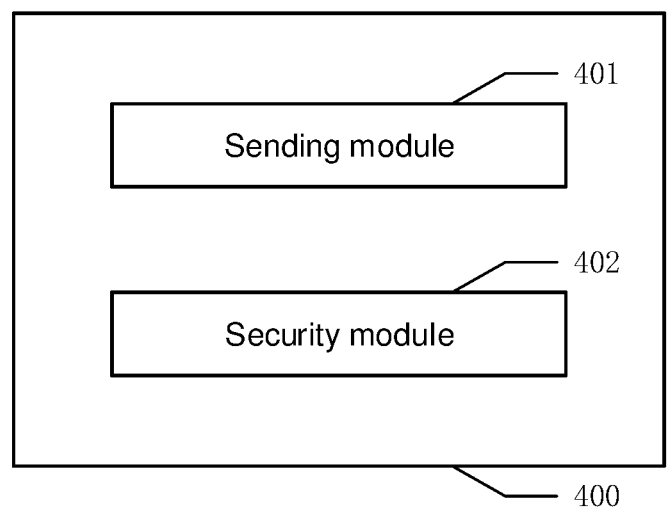
FIG. 4A shows a schematic block diagram of a device for blockchain nodes according to an embodiment of the present disclosure.

FIG. 4A shows a schematic block diagram of a device for blockchain nodes according to an embodiment of the present disclosure.

As shown in FIG. 4A, the device for blockchain nodes 400 comprises: a sending module 401 and a security module 402.

The sending module 401 is used to send security data of an Internet of Things system to other blockchain nodes, so that each blockchain node stores the security data in a blockchain database for said each blockchain node.

The security module 402 is used to obtain one or more pieces of security data of the Internet of Things system from a blockchain database for a current blockchain node, and perform a corresponding operation on the Internet of Things system based on the obtained security data.

In an embodiment of the present disclosure, the security data of the Internet of Things system comprises a security rule and/or an operation log of a gateway device of the Internet of Things system. When the security rule of the gateway device of the Internet of Things system is set, the sending module 401 is used to send the set security rule to other blockchain nodes, wherein the security rule comprises one or more sub-rules; and/or, when the operation log is generated in the gateway device of the Internet of Things system, the sending module 401 is configured to send the generated operation log to other blockchain nodes.

In an embodiment of the present disclosure, the security module 402 is used to obtain a security rule initially set by the gateway device from the blockchain database for the current blockchain node; and determine whether a local security rule of the gateway device is consistent with the obtained security rule; if the local security rule of the gateway device is consistent with the obtained security rule, determine that the local security rule of the gateway device has not been tampered with, so that the gateway device performs the corresponding operation on the Internet of Things system according to the local security rule; and if the local security rule of the gateway device is not consistent with the obtained security rule, determine that the local security rule of the gateway device has been tampered with, so that the gateway device performs the corresponding operation on the Internet of Things system according to the obtained security rule.

In an embodiment of the present disclosure, the security module 402 is used to obtain an operation log of the gateway device within a preset history time period from the blockchain database for the current blockchain node; and determine whether a local operation log of the gateway device within the preset history time period is consistent with the obtained operation log; if the local operation log of the gateway device within the preset history time period is consistent with the obtained operation log, determine that the local operation log of the gateway device within the preset history time period has not been tampered with, so that the gateway device performs the corresponding operation on the Internet of Things system according to the local operation log; and if the local operation log of the gateway device within the preset history time period is not consistent with the obtained operation log, determine that the operation log of the gateway device within the preset history time period has been tampered with, so that the gateway device performs the corresponding operation on the Internet of Things system according to the obtained operation log.

In an embodiment of the present disclosure, the operation log of the gateway device is an operation log of at least one of modifying, adding, and deleting the security rule. The security module 402 is used to obtain an operation log of the gateway device from the blockchain database for the current blockchain node; and determine whether a local operation log of the gateway device is consistent with the obtained operation log; if the local operation log of the gateway device is consistent with the obtained operation log, determine that the local security rule and the operation log of the gateway device have not been tampered with, so that the gateway device performs the corresponding operation on the Internet of Things system according to the local security rule; and if the local operation log of the gateway device is not consistent with the obtained operation log, determine that the local security rule and the operation log of the gateway device have been tampered with, and obtaining a non-tampered security rule according to a difference between the local operation log and the obtained operation log, so that the gateway device performs the corresponding operation on the Internet of Things system according to the non-tampered security rule.

In an embodiment of the present disclosure, the sending module 401 is further used to send the security data together with identification information of the gateway device to other blockchain nodes, so that said each blockchain node stores the security data and the identification information of the gateway device in the blockchain database for said each blockchain node. The security module 402 is configured to search for and read corresponding one or more pieces of security data of the identification information of the gateway device from the blockchain database for the current blockchain node according to the identification information of the gateway device.

In an embodiment of the present disclosure, the current blockchain node comprises: the gateway device of the Internet of Things system.

In an embodiment of the present disclosure, the gateway device of the Internet of Things system is used for performing at least one of local monitoring of the Internet of Things system, network protocol conversion of the Internet of Things system, and edge computing of the Internet of Things system.

Figure 4B:
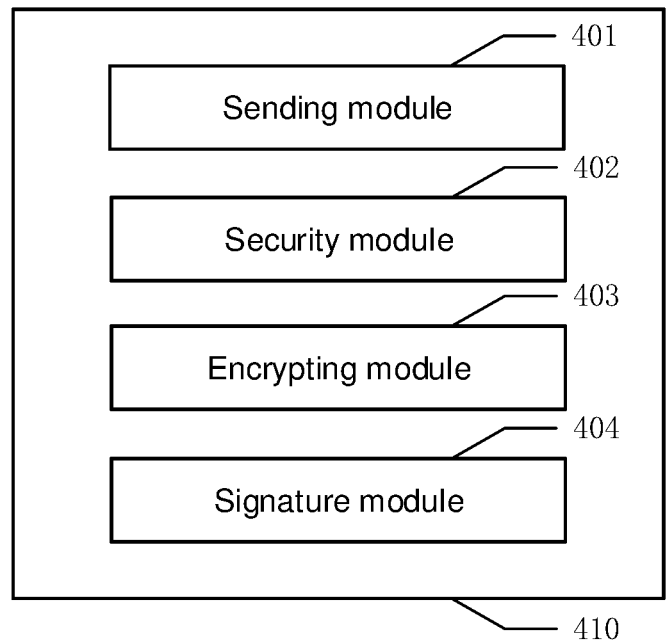
FIG. 4B shows a schematic block diagram of a device for blockchain nodes according to another embodiment of the present disclosure.

FIG. 4B shows a schematic block diagram of a device for blockchain nodes according to another embodiment of the present disclosure.

As shown in FIG. 4B, the device for blockchain nodes 410 comprises: a sending module 401, a security module 402, an encrypting module 403 and a signature module 404.

The sending module 401 and the security module 402 have been described above, and the repeated parts will not be repeated.

The encrypting module 403 is configured to encrypt the security data according to a preset encrypting rule to obtain the encrypted security data.

The sending module 401 is configured to send the encrypted security data to other blockchain nodes, so that said each blockchain node stores the encrypted security data in the blockchain database for said each blockchain node.

The signature module 404 is used to generate a public key and a private key; and generate a digital signature based on the security data and the private key before sending the security data of the Internet of Things system to other blockchain nodes.

The sending module 401 is used to send the security data together with the digital signature for the security data, and the public key to other blockchain nodes, so that said each blockchain node verifies the security data based on the digital signature and the public key, and stores the verified security data in the blockchain database for said each blockchain node.

In an embodiment of the present disclosure, the signature module 404 performs a hash calculation on a character string comprising the security data and the private key to obtain the digital signature.

In other embodiments of the present disclosure, the device for blockchain nodes may only comprise the sending module 401, the security module 402, and the encrypting module 403, or, the device for blockchain nodes may only comprise the sending module 401, the security module 402, and the signature module 404, the corresponding function has been introduced above, and will not be repeated.

Figure 4C:
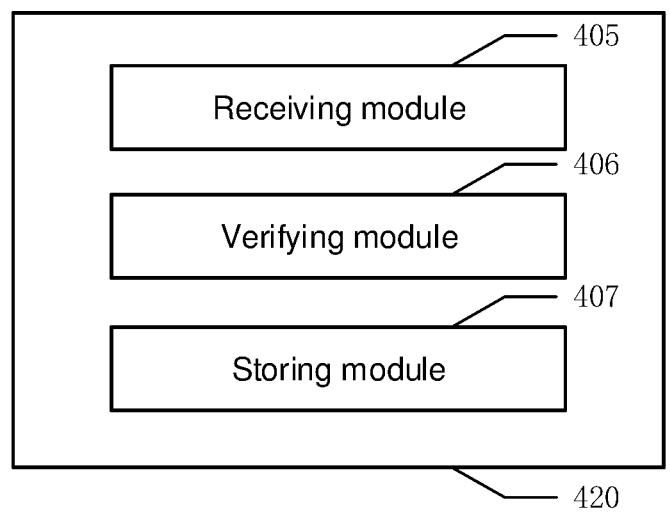
FIG. 4C shows a schematic block diagram of a device for blockchain nodes according to another embodiment of the present disclosure.

FIG. 4C shows a schematic block diagram of a device for blockchain nodes according to another embodiment of the present disclosure. As shown in FIG. 4C, the device for blockchain nodes 420 comprises: a receiving module 405, a verifying module 406 and a storing module 407.

The receiving module 405 is used to receive security data of an Internet of Things system sent by other blockchain nodes.

The verifying module 406 is used to verify the security data with other blockchain nodes.

The storing module 407 is used to store the verified security data in a blockchain database for each blockchain node.

In an embodiment of the present disclosure, the security data of the Internet of Things system comprises: a security rule and/or an operation log of a gateway device of the Internet of Things system.

In an embodiment of the present disclosure, the received security data is a security data encrypted according to a preset encrypting rule.

In an embodiment of the present disclosure, the receiving module 405 is further used to receive a digital signature for the security data together with a public key for a blockchain node sending the security data; wherein the digital signature for the security data is generated based on the security data and a private key for the current blockchain node sending the security data. The verifying module 406 is used to verify the security data based on the digital signature and the public key.

In an embodiment of the present disclosure, the receiving module 405 is further used to receive identification information of the gateway device for the security data. The storing module 407 is used to store the verified security data and the identification information of the gateway device of the security device in the blockchain database for said each blockchain node.

In an embodiment of the present disclosure, the current blockchain node comprises: the gateway device of the Internet of Things system.

In an embodiment of the present disclosure, the gateway device of the Internet of Things system is used for performing at least one of local monitoring of the Internet of Things system, network protocol conversion of the Internet of Things system, and edge computing of the Internet of Things system.

It should be noted that the implementation of the modules/units/subunits, etc., the technical problems solved, the functions achieved, and the technical effects achieved in embodiments of the device are the same as or similar to the implementation of corresponding steps, the technical problems solved, the functions achieved, and the technical effects achieved, and will not be repeated here.

Functions of two or more of modules, sub-modules, units, and subunits according to the embodiments of the present disclosure, or at least a part thereof, may be implemented in one module. One or more of the modules, sub-modules, units, and sub-units according to the embodiments of the present disclosure may be split into multiple modules for implementation. One or more of the modules, sub-modules, units, and sub-units according to the embodiments of the present disclosure may be at least partially implemented as hardware circuits, such as field programmable gate array (FPGA), programmable logic array (PLA), system-on-chip, system-on-substrate, system-on-package, application specific integrated circuit (ASIC), or may be implemented by hardware or firmware in any other reasonable way that integrates or encapsulates the circuit, or by any one of the three implementation modes of software, hardware and firmware or in an appropriate combination of any of them. Alternatively, one or more of the modules, sub-modules, units, and sub-units according to the embodiments of the present disclosure may be at least partially implemented as a computer program module, and when the computer program module is run, may perform corresponding functions.

For example, two or more of the sending module 401, the security module 402, the encrypting module 403, and the signature module 404 may be combined into one module for implementation, or one of the sending module 401, the security module 402, the encrypting module 403, and the signature module 404 may be split into multiple modules. Alternatively, at least part of the functions of the one or more modules may be combined with at least part of the functions of other modules and implemented in one module. According to an embodiment of the present disclosure, at least one of the sending module 401, the security module 402, the encrypting module 403, and the signature module 404 may be at least partially implemented as a hardware circuit, such as field programmable gate array (FPGA), programmable logic array (PLA), system-on-chip, system-on-substrate, system-on-package, application specific integrated circuit (ASIC), or may be implemented by hardware or firmware in any other reasonable way that integrates or encapsulates the circuit, or by any one of the three implementation modes of software, hardware and firmware or in an appropriate combination of any of them. Alternatively, at least one of the sending module 401, the security module 402, the encrypting module 403, and the signature module 404 may be at least partially implemented as a computer program module, and when the computer program module is run, it may perform corresponding functions.

For another example, two or more of the receiving module 405, the verifying module 406, and the storing module 407 may be combined into one module for implementation, or one of the receiving module 405, the verifying module 406, and the storing module 407 may be split into multiple modules. Alternatively, at least part of the functions of the one or more modules may be combined with at least part of the functions of other modules and implemented in one module. According to an embodiment of the present disclosure, at least one of the receiving module 405, the verifying module 406, and the storing module 407 may be at least partially implemented as a hardware circuit, such as a field programmable gate array (FPGA), a programmable logic array (PLA), system-on-chip, system-on-substrate, system-on-package, application specific integrated circuit (ASIC), or may be implemented by hardware or firmware in any other reasonable way that integrates or encapsulates the circuit, or by any one of the three implementation modes of software, hardware and firmware or in an appropriate combination of any of them. Alternatively, at least one of the receiving module 405, the verifying module 406, and the storing module 407 may be at least partially implemented as a computer program module, and when the computer program module is run, it may perform a corresponding function.

Figure 5:
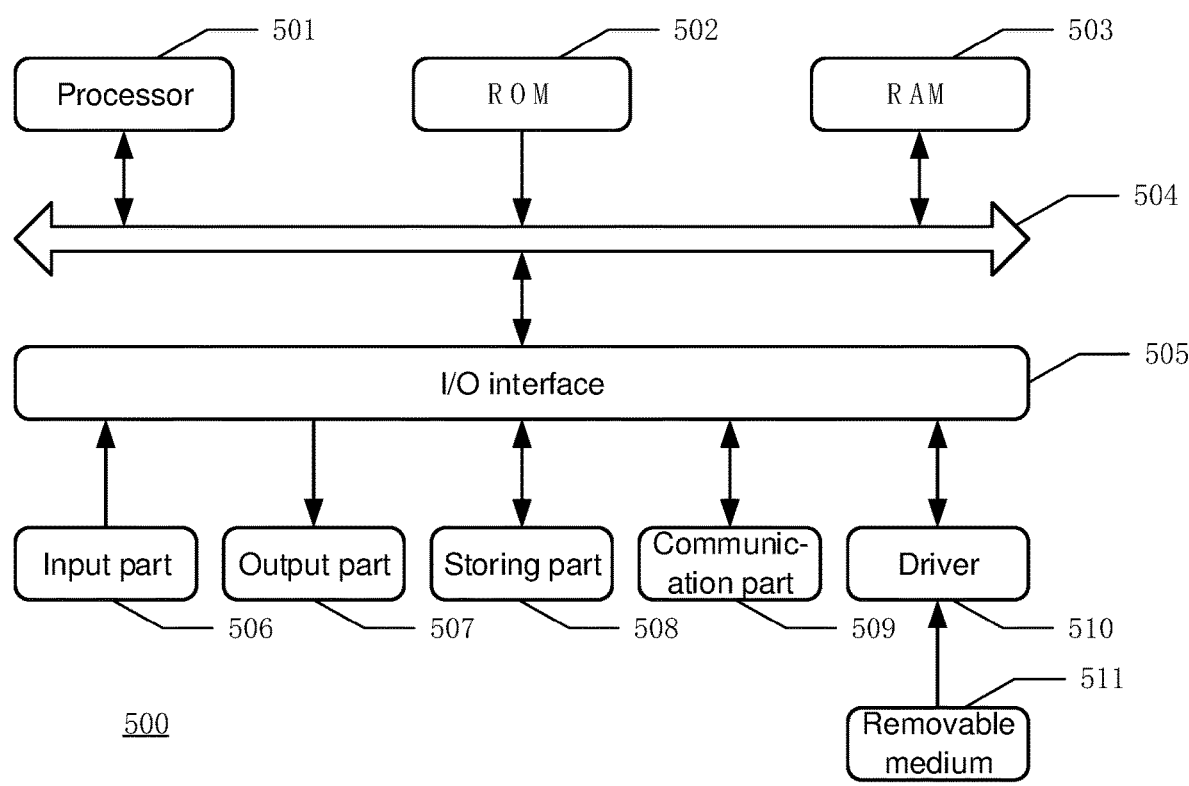
FIG. 5 shows a schematic block diagram of a computer system suitable for implementing a method for blockchain nodes according to an embodiment of the present disclosure.

FIG. 5 shows a schematic block diagram of a computer system suitable for implementing a method for blockchain nodes according to an embodiment of the present disclosure. The computer system shown in FIG. 5 is only an example, and should not bring any limitation to the functions and application scope of the embodiment of the present disclosure.

As shown in FIG. 5, a computer system 500 according to an embodiment of the present disclosure comprises a processor 501, wherein the processor 501 may execute various appropriate actions and processing according to a program stored in a read-only memory (ROM) 502 or a program loaded from a storing part 508 to a random access memory (RAM) 503. The processor 501 may comprise, for example, a general-purpose microprocessor (e.g., a CPU), an instruction set processor and/or a related chipset and/or a special-purpose microprocessor (e.g., an application specific integrated circuit (ASIC)), and so on. The processor 501 may also comprise on-board memory for caching purposes. The processor 501 may comprise a single processing unit for executing different actions of the method flow according to the embodiments of the present disclosure or multiple processing units.

In the RAM 503, various programs and data required for the operation of the system 500 are stored. The processor 501, the ROM 502, and the RAM 503 are connected to each other through a bus 504. The processor 501 executes various operations of the method flow according to the embodiments of the present disclosure by executing programs in the ROM 502 and/or RAM 503. It should be noted that the program may also be stored in one or more memories other than the ROM 502 and the RAM 503. The processor 501 may also execute various operations of the method flow according to the embodiment of the present disclosure by executing programs stored in the one or more memories.

According to an embodiment of the present disclosure, the system 500 may further comprise an input/output (I/O) interface 505, and the input/output (I/O) interface 505 is also connected to the bus 504. The system 500 may also comprise one or more of the following components connected to the I/O interface 505: an input part 506 comprising a keyboard, a mouse, etc.; an output part 507 comprising a cathode ray tube (CRT), a liquid crystal display (LCD), etc., and a speaker, etc.; a storing part 508 comprising a hard disk, etc.; and a communication part 509 comprising a network interface card such as a LAN card, a modem, etc. The communication part 509 performs communication processing via a network such as the Internet. The driver 510 is also connected to the I/O interface 505 as needed. A removable medium 511, such as a magnetic disk, an optical disk, a magneto-optical disk, a semiconductor memory, etc., is installed on the drive 510 as needed, so that the computer program read from the removable medium 511 is installed into the storing part 508 as needed.

According to the embodiments of the present disclosure, the method flow according to the embodiments of the present disclosure may be implemented as a computer software program. For example, an embodiment of the present disclosure comprises a computer program product, which comprises a computer program carried on a computer-readable medium, and the computer program comprises program code for executing the method shown in the flowchart. In such an embodiment, the computer program may be downloaded and installed from the network through the communication part 509, and/or installed from the removable medium 511. When the computer program is executed by the processor 501, the above functions defined in the system of the embodiments of the present disclosure are executed. According to the embodiments of the present disclosure, the systems, devices, apparatus, modules, units, etc. described above may be implemented by computer program modules.

The present disclosure also provides a computer-readable medium. The computer-readable medium may be comprised in the device/apparatus/system described in the above embodiments; or it may exist alone without being assembled into the device/apparatus/system. The above computer-readable medium carries one or more programs, and when the one or more programs are executed, it realizes: the blockchain consensus reaching method described in the above embodiments.

According to an embodiment of the present disclosure, the computer-readable medium may be a computer-readable signal medium or a computer-readable storage medium or any combination of the two. The computer-readable storage medium may be, for example, but not limited to, an electrical, magnetic, optical, electromagnetic, infrared, or semiconductor system, device, or apparatus, or any combination of the above. More specific examples of computer-readable storage medium may comprise, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the present disclosure, the computer-readable storage medium may be any tangible medium that comprises or stores a program, and the program may be used by or in combination with an instruction execution system, device, or apparatus. In the present disclosure, a computer-readable signal medium may comprise a data signal propagated in a baseband or as a part of a carrier wave, and a computer-readable program code is carried therein. The propagated data signal may take various forms, comprising but not limited to electromagnetic signals, optical signals, or any suitable combination of them. The computer-readable signal medium may also be any computer-readable medium other than the computer-readable storage medium, the computer-readable medium may send, propagate, or transmit the program for use or in combination with the instruction execution system, device, or apparatus. The program code comprised in the computer-readable medium may be transmitted by any suitable medium, comprising but not limited to: wireless, wired, optical cable, radio frequency signals, etc., or any suitable combination of the above.

For example, according to an embodiment of the present disclosure, the computer-readable medium may comprise one or more memories other than the ROM 502 and/or RAM 503 and/or ROM 502 and RAM 503 described above.

The flowcharts and block diagrams in the accompanying drawings illustrate the possible architecture, functions, and operations of the system, method, and computer program product according to various embodiments of the present disclosure. In this regard, each block in the flowchart or block diagram may represent a module, program segment, or part of code, and the module, program segment, or part of code comprises one or more executable instructions for realizing the specified logical function. It should also be noted that, in some alternative implementations, the functions marked in the block may also occur in a different order from the order marked in the drawings. For example, two blocks shown in succession may actually be executed substantially in parallel, and they may sometimes be executed in the reverse order, depending on the functions involved. It should also be noted that each block in the block diagram or flowchart, and the combination of blocks in the block diagram or flowchart, may be implemented by a dedicated hardware-based system that performs the specified functions or operations, or may be realized by a combination of dedicated hardware and computer instructions.

1. A method for blockchain nodes, comprising:
   sending security data of an Internet of Things system to other blockchain nodes, so that each blockchain node stores the security data in a blockchain database for said each blockchain node; and
   obtaining one or more pieces of security data of the Internet of Things system from a blockchain database for a current blockchain node, and performing a corresponding operation on the Internet of Things system based on the obtained security data.

2. The method of clause 1, wherein:
   the security data of the Internet of Things system comprises a security rule and/or an operation log of a gateway device of the Internet of Things system; and
   sending the security data of the Internet of Things system to other blockchain nodes comprises:
   when the security rule of the gateway device of the Internet of Things system is set, sending the set security rule to other blockchain nodes, wherein the security rule comprises one or more sub-rules; and/or
   when the operation log is generated in the gateway device of the Internet of
   Things system, sending the generated operation log to other blockchain nodes.

3. The method of clause 1, further comprises: encrypting the security data according to a preset encrypting rule to obtain the encrypted security data before sending the security data of the Internet of Things system to other blockchain nodes;
   wherein sending the security data of the Internet of Things system to other blockchain nodes comprises: sending the encrypted security data to other blockchain nodes, so that said each blockchain node stores the encrypted security data in the blockchain database for said each blockchain node.

4. The method of clause 1, further comprises: generating a public key and a private key; and generating a digital signature based on the security data and the private key before sending the security data of the Internet of Things system to other blockchain nodes;
   wherein sending the security data of the Internet of Things system to other blockchain nodes comprises: sending the security data together with the digital signature for the security data and the public key to other blockchain nodes, so that said each blockchain node verifies the security data based on the digital signature and the public key, and stores the verified security data in the blockchain database for said each blockchain node.

5. The method of clause 4, wherein generating the digital signature based on the security data and the private key comprises: performing a hash calculation on a character string comprising the security data and the private key to obtain the digital signature.

6. The method of clause 2, wherein obtaining one or more pieces of security data of the Internet of Things system from the blockchain database for the current blockchain node, and performing the corresponding operation on the Internet of Things system based on the obtained security data comprises:

obtaining a security rule initially set by the gateway device from the blockchain database for the current blockchain node;

determining whether a local security rule of the gateway device is consistent with the obtained security rule;

if the local security rule of the gateway device is consistent with the obtained security rule, it is determined that the local security rule of the gateway device has not been tampered with, so that the gateway device performs the corresponding operation on the Internet of Things system according to the local security rule; and if the local security rule of the gateway device is not consistent with the obtained security rule, it is determined that the local security rule of the gateway device has been tampered with, so that the gateway device performs the corresponding operation on the Internet of Things system according to the obtained security rule.

7. The method of clause 2, wherein obtaining one or more pieces of security data of the Internet of Things system from the blockchain database for the current blockchain node, and performing the corresponding operation on the Internet of Things system based on the obtained security data comprises:

obtaining an operation log of the gateway device within a preset history time period from the blockchain database for the current blockchain node;

determining whether a local operation log of the gateway device within the preset history time period is consistent with the obtained operation log;

if the local operation log of the gateway device within the preset history time period is consistent with the obtained operation log, it is determined that the local operation log of the gateway device within the preset history time period has not been tampered with, so that the gateway device performs the corresponding operation on the Internet of Things system according to the local operation log; and if the local operation log of the gateway device within the preset history time period is not consistent with the obtained operation log, it is determined that the operation log of the gateway device within the preset history time period has been tampered with, so that the gateway device performs the corresponding operation on the Internet of Things system according to the obtained operation log.

8. The method of clause 7, wherein:

the operation log of the gateway device is an operation log of at least one of modifying, adding, and deleting the security rule; and obtaining one or more pieces of security data of the Internet of Things system from the blockchain database for the current blockchain node, and performing the corresponding operation on the Internet of Things system based on the obtained security data comprises:

obtaining an operation log of the gateway device from the blockchain database for the current blockchain node;

determining whether a local operation log of the gateway device is consistent with the obtained operation log;

if the local operation log of the gateway device is consistent with the obtained operation log, it is determined that the local security rule and the operation log of the gateway device have not been tampered with, so that the gateway device performs the corresponding operation on the Internet of Things system according to the local security rule; and if the local operation log of the gateway device is not consistent with the obtained operation log, it is determined that the local security rule and the operation log of the gateway device have been tampered with, and obtain a non-tampered security rule according to a difference between the local operation log and the obtained operation log, so that the gateway device performs the corresponding operation on the Internet of Things system according to the non-tampered security rule.

9. The method of clause 2, wherein:

sending the security data of the Internet of Things system to other blockchain nodes, so that said each blockchain node stores the security data in the blockchain database for said each blockchain node comprises: sending the security data together with identification information of the gateway device to other blockchain nodes, so that said each blockchain node stores the security data and the identification information of the gateway device in the blockchain database for said each blockchain node; and obtaining one or more pieces of security data of the Internet of Things system from the blockchain database for a current blockchain node comprises: searching for and reading corresponding one or more pieces of security data of the identification information of the gateway device from the blockchain database for the current blockchain node according to the identification information of the gateway device.

10. The method of clause 2, wherein:

the current blockchain node is the gateway device of the Internet of Things system.

11. The method of clause 2 or 10, wherein:

the gateway device of the Internet of Things system is configured for performing at least one of local monitoring of the Internet of Things system, network protocol conversion of the Internet of Things system, and edge computing of the Internet of Things system.

12. A method for blockchain nodes, comprising:

receiving security data of an Internet of Things system sent by other blockchain nodes, verifying the security data with other blockchain nodes, and storing the verified security data in a blockchain database for each blockchain node.

13. The method of clause 12, wherein:

the security data of the Internet of Things system comprises: a security rule and/or an operation log of a gateway device of the Internet of Things system.

14. The method of clause 12, wherein:

the received security data is a security data encrypted according to a preset encrypting rule.

15. The method of clause 12, wherein:

receiving the security data of the Internet of Things system sent by other blockchain nodes further comprises: receiving a digital signature for the security data and a public key for a blockchain node sending the security data; wherein the digital signature for the security data is generated based on the security data and a private key for the blockchain node sending the security data; and verifying the security data with other blockchain nodes, and storing the verified security data in the blockchain database for said each blockchain node comprises: verifying the security data based on the digital signature for the security data and the public key for the blockchain node sending the security data, and storing the verified security data in the blockchain database for said each blockchain node.

16. The method of clause 13, wherein:
receiving the security data of the Internet of Things system sent by other blockchain nodes further comprises: receiving identification information of the gateway device for the security data; and verifying the security data with other blockchain nodes, and storing the verified security data in the blockchain database for said each blockchain node comprises: verifying the security data with other blockchain nodes, and storing the verified security data and the identification information of the gateway device of the security device in the blockchain database for said each blockchain node.

17. The method of clause 13, wherein:
the current blockchain node comprises: the gateway device of the Internet of Things system.

18. The method of clause 13 or 17, wherein, the gateway device of the Internet of Things system is configured for performing at least one of local monitoring of the Internet of Things system, network protocol conversion of the Internet of Things system, and edge computing of the Internet of Things system.

19. A device for blockchain nodes, comprising:
a sending module, configured to send security data of an Internet of Things system to other blockchain nodes, so that each blockchain node stores the security data in a blockchain database for said each blockchain node; and a security module, configured to obtain one or more pieces of security data of the Internet of Things system from a blockchain database for a current blockchain node, and perform a corresponding operation on the Internet of Things system based on the obtained security data.

20. The device of clause 19, wherein:
the security data of the Internet of Things system comprises a security rule and/or an operation log of a gateway device of the Internet of Things system; and the sending module is configured to when the security rule of the gateway device of the Internet of Things system is set, send the set security rule to other blockchain nodes, wherein the security rule comprises one or more sub-rules; and/or when the operation log is generated in the gateway device of the Internet of Things system, send the generated operation log to other blockchain nodes.

21. The device of clause 19, further comprises: an encrypting module;
the encrypting module is configured to encrypt the security data according to a preset encrypting rule to obtain the encrypted security data;
wherein the sending module is configured to send the encrypted security data to other blockchain nodes, so that said each blockchain node stores the encrypted security data in the blockchain database for said each blockchain node.

22. The device of clause 19, further comprises: a signature module;
the signature module is configured to generate a public key and a private key; and generate a digital signature based on the security data and the private key before sending the security data of the Internet of Things system to other blockchain nodes;
wherein the sending module is configured to send the security data together with the digital signature for the security data, and the public key to other blockchain nodes, so that said each blockchain node verifies the security data based on the digital signature and the public key, and stores the verified security data in the blockchain database for said each blockchain node.

23. The device of clause 22, wherein the signature module is configured to perform a hash calculation on a character string comprising the security data and the private key to obtain the digital signature.

24. The device of clause 20, wherein the security module is configured to obtain a security rule initially set by the gateway device from the blockchain database for the current blockchain node; and determine whether a local security rule of the gateway device is consistent with the obtained security rule; if the local security rule of the gateway device is consistent with the obtained security rule, determine that the local security rule of the gateway device has not been tampered with, so that the gateway device performs the corresponding operation on the Internet of Things system according to the local security rule; and if the local security rule of the gateway device is not consistent with the obtained security rule, determine that the local security rule of the gateway device has been tampered with, so that the gateway device performs the corresponding operation on the Internet of Things system according to the obtained security rule.

25. The device of clause 20, wherein the security module is configured to obtain an operation log of the gateway device within a preset history time period from the blockchain database for the current blockchain node; and determine whether a local operation log of the gateway device within the preset history time period is consistent with the obtained operation log; if the local operation log of the gateway device within the preset history time period is consistent with the obtained operation log, determine that the local operation log of the gateway device within the preset history time period has not been tampered with, so that the gateway device performs the corresponding operation on the Internet of Things system according to the local operation log; and if the local operation log of the gateway device within the preset history time period is not consistent with the obtained operation log, determine that the operation log of the gateway device within the preset history time period has been tampered with, so that the gateway device performs the corresponding operation on the Internet of Things system according to the obtained operation log.

26. The device of clause 25, wherein, the operation log of the gateway device is an operation log of at least one of modifying, adding, and deleting the security rule; and the security module is configured to obtain an operation log of the gateway device from the blockchain database for the current blockchain node; determine whether a local operation log of the gateway device is consistent with the obtained operation log; if the local operation log of the gateway device is consistent with the obtained operation log, determine that the local security rule and the operation log of the gateway device have not been tampered with, so that the gateway device performs the corresponding operation on the Internet of Things system according to the local security rule; and if the local operation log of the gateway device is not consistent with the obtained operation log, determine that the local security rule and the operation log of the gateway device have been tampered with, and obtain a non-tampered security rule according to a difference between the local operation log and the obtained operation log, so that the gateway device performs the corresponding operation on the Internet of Things system according to the non-tampered security rule.

27. The device of clause 20, wherein:
the sending module is further configured to send the security data together with identification information of the gateway device to other blockchain nodes, so that said each blockchain node stores the security data and the identification information of the gateway device in the blockchain database for said each blockchain node; and the security module is configured to search and read corresponding one or more pieces of security data of the identification information of the gateway device from the blockchain database for the current blockchain node according to the identification information of the gateway device.

28. The device of clause 20, wherein:
the current blockchain node comprises: the gateway device of the Internet of Things system.

29. The device of clause 20 or 28, wherein, the gateway device of the Internet of Things system is configured for performing at least one of local monitoring of the Internet of Things system, network protocol conversion of the Internet of Things system, and edge computing of the Internet of Things system.

30. A device for blockchain nodes, comprising:
a receiving module, configured to receive security data of an Internet of Things system sent by other blockchain nodes;
a verifying module, configured to verify the security data with other blockchain nodes; and
a storing module configured to store the verified security data in a blockchain database for each blockchain node.

31. The device of clause 30, wherein:
the security data of the Internet of Things system comprises: a security rule and/or an operation log of a gateway device of the Internet of Things system.

32. The device of clause 30, wherein:
the received security data is a security data encrypted according to a preset encrypting rule.

33. The device of clause 30, wherein:
the receiving module is further configured to receive a digital signature for the security data together with a public key for a blockchain node sending the security data; wherein the digital signature for the security data is generated based on the security data and a private key for the blockchain node sending the security data; and
the verifying module is configured to verify the security data based on the digital signature and the public key.

34. The device of clause 31, wherein:
the receiving module is further configured to receive identification information of the gateway device for the security data; and
the storing module is configured to store the verified security data and the identification information of the gateway device of the security device in the blockchain database for said each blockchain node.

35. The device of clause 31, wherein:
the current blockchain node comprises: the gateway device of the Internet of Things system.

36. The device of clause 35 or 31, wherein, the gateway device of the Internet of Things system is configured for performing at least one of local monitoring of the Internet of Things system, network protocol conversion of the Internet of Things system, and edge computing of the Internet of Things system.

37. A computer system, comprising a memory, a processor, and a computer program stored on the memory and running on the processor, wherein the processor, when executing the program, implements the method of any one of clauses 1-11, and/or the method of any one of clauses 12-18.

38. A computer readable medium, storing executable instructions thereon, wherein the instructions, when executed by a processor, cause the processor to execute the method of any one of clauses 1-11, and/or the method of any one of clauses 12-18.

Those skilled in the art may understand that the features described in the various embodiments and/or the claims of the present disclosure may be combined and/or integrated in various ways, even if such combinations or integrations are not explicitly described in the present disclosure. In particular, without departing from the spirit and teaching of the present disclosure, the features described in the various embodiments and/or the claims of the present disclosure may be combined and/or integrated in various ways. All these combinations and/or integrations fall within the scope of the present disclosure.

The embodiments of the present disclosure have been described above. However, these embodiments are only for illustrative purposes, and are not intended to limit the scope of the present disclosure. Although the embodiments are described respectively above, it does not mean that the measures in the respective embodiments cannot be advantageously used in combination. The scope of the present disclosure is defined by the appended claims and their equivalents. Without departing from the scope of the present disclosure, those skilled in the art may make various substitutions and modifications, and these substitutions and modifications should fall within the scope of the present disclosure.

We claim:

1. A method for blockchain nodes, the method comprising:
sending security data of an Internet of Things (IoT) system to other blockchain nodes, so that each such blockchain node stores the security data in a blockchain database for that blockchain node; and
obtaining one or more pieces of security data of the IoT system from a blockchain database for a current blockchain node, and performing a corresponding operation on the IoT system based on the obtained security data,
wherein the security data of the IoT system comprises a security rule and an operation log of a gateway device of the IoT system;
wherein sending the security data of the IoT system to other blockchain nodes comprises:
when the security rule of the gateway device of the IoT system is set, sending the set security rule to other blockchain nodes, wherein the security rule comprises one or more sub-rules, and
when the operation log is generated in the gateway device of the IoT system, sending the generated operation log to other blockchain nodes; and
wherein obtaining one or more pieces of security data of the IoT system from the blockchain database for the current blockchain node, and performing the corresponding operation on the IoT system based on the obtained security data comprises:
obtaining an operation log of the gateway device from the blockchain database for the current blockchain node,
determining whether a local operation log of the gateway device is consistent with the obtained operation log,
responsive to the local operation log of the gateway device being consistent with the obtained operation log, it is determined that a local security rule and the operation log of the gateway device have not been tampered with, so that the gateway device performs the corresponding operation on the IoT system according to the local security rule, and
responsive to the local operation log of the gateway device being not consistent with the obtained operation log, it is determined that the local security rule and the operation log of the gateway device have been tampered with, and obtaining a non-tampered security rule according to a difference between the local operation log and the obtained operation log, so that the gateway device performs the corresponding operation on the IoT system according to the non-tampered security rule; and wherein the operation log of the gateway device comprises an operation log of at least one selected from: modifying, adding, and/or deleting the security rule.

2. The method of claim 1, further comprising encrypting the security data according to a preset encrypting rule to obtain encrypted security data before sending the security data of the IoT system to other blockchain nodes;

wherein sending the security data of the IoT system to other blockchain nodes comprises sending the encrypted security data to other blockchain nodes, so that each such blockchain node stores the encrypted security data in the blockchain database for that blockchain node.

3. The method of claim 1, further comprising:

generating a public key and a private key; and generating a digital signature based on the security data and the private key before sending the security data of the IoT system to other blockchain nodes, wherein sending the security data of the IoT system to other blockchain nodes comprises sending the security data together with the digital signature for the security data and the public key to other blockchain nodes, so that each such blockchain node verifies the security data based on the digital signature and the public key, and stores the verified security data in the blockchain database for that blockchain node.

4. The method of claim 3, wherein generating the digital signature based on the security data and the private key comprises performing a hash calculation on a character string comprising the security data and the private key to obtain the digital signature.

5. The method of claim 1, wherein obtaining one or more pieces of security data of the IoT system from the blockchain database for the current blockchain node, and performing the corresponding operation on the IoT system based on the obtained security data further comprises:

obtaining a security rule initially set by the gateway device from the blockchain database for the current blockchain node;

determining whether a local security rule of the gateway device is consistent with the obtained security rule;

responsive to the local security rule of the gateway device being consistent with the obtained security rule, it is determined that the local security rule of the gateway device has not been tampered with, so that the gateway device performs the corresponding operation on the IoT system according to the local security rule; and responsive to the local security rule of the gateway device being not consistent with the obtained security rule, it is determined that the local security rule of the gateway device has been tampered with, so that the gateway device performs the corresponding operation on the IoT system according to the obtained security rule.

6. The method of claim 1, wherein:

sending the security data of the IoT system to other blockchain nodes, so that each such blockchain node stores the security data in the blockchain database for that blockchain node comprises sending the security data together with identification information of the gateway device to other blockchain nodes, so that each such blockchain node stores the security data and the identification information of the gateway device in the blockchain database for that blockchain node; and obtaining one or more pieces of security data of the IoT system from the blockchain database for a current blockchain node comprises searching for and reading corresponding one or more pieces of security data of the identification information of the gateway device from the blockchain database for the current blockchain node according to the identification information of the gateway device.

7. The method of claim 1, wherein:

the current blockchain node is the gateway device of the IoT system, and/or the gateway device of the IoT system is configured for performing at least one selected from: local monitoring of the IoT system, network protocol conversion of the IoT system, and/or edge computing of the IoT system.

8. A computer system, comprising a memory, a processor system, and a computer program stored on the memory, wherein the program is configured to, upon execution of the program, cause the processor system to implement the method of claim 1.

9. A non-transitory computer readable medium, storing executable instructions, the instructions, when executed by a processor system, configured to cause the processor system to at least:

send security data of an Internet of Things (IoT) system to other blockchain nodes, so that each such blockchain node stores the security data in a blockchain database for that blockchain node; and obtain one or more pieces of security data of the IoT system from a blockchain database for a current blockchain node, and perform a corresponding operation on the IoT system based on the obtained security data, wherein the security data of the IoT system comprises a security rule and an operation log of a gateway device of the IoT system;

wherein the instructions configured to cause the processor system to send the security data of the IoT system to other blockchain nodes are further configured to cause the processor system to:

when the security rule of the gateway device of the IoT system is set, send the set security rule to other blockchain nodes, wherein the security rule comprises one or more sub-rules, and when the operation log is generated in the gateway device of the IoT system, send the generated operation log to other blockchain nodes; and wherein the instructions configured to cause processor system to obtain one or more pieces of security data of the IoT system from the blockchain database for the current blockchain node, and perform of the corresponding operation on the IoT system based on the obtained security data are further configured to cause the processor system to:

obtain an operation log of the gateway device from the blockchain database for the current blockchain node, determine whether a local operation log of the gateway device is consistent with the obtained operation log, responsive to the local operation log of the gateway device being consistent with the obtained operation log, determine that a local security rule and the operation log of the gateway device have not been tampered with, so that the gateway device performs the corresponding operation on the IoT system according to the local security rule, and responsive to the local operation log of the gateway device being not consistent with the obtained operation log, determine that the local security rule and the operation log of the gateway device have been tampered with, and obtain a non-tampered security rule according to a difference between the local operation log and the obtained operation log, so that the gateway device performs the corresponding operation on the IoT system according to the non-tampered security rule; and wherein the operation log of the gateway device comprises an operation log of at least one selected from: modifying, adding, and/or deleting the security rule.

10. The medium of claim 9, wherein the instructions are further configured to cause the processor system to encrypt the security data according to a preset encrypting rule to obtain encrypted security data before sending of the security data of the IoT system to other blockchain nodes;

wherein the instructions configured to cause the processor system to send the security data of the IoT system to other blockchain nodes are further configured to cause the processor system to send the encrypted security data to other blockchain nodes, so that each such blockchain node stores the encrypted security data in the blockchain database for that blockchain node.

11. The medium of claim 9, wherein the instructions are further configured to cause the processor system to:

generate a public key and a private key; and generate a digital signature based on the security data and the private key before sending the security data of the IoT system to other blockchain nodes, wherein the instructions configured to cause the processor system to send the security data of the IoT system to other blockchain nodes are further configured to cause the processor system to send the security data together with the digital signature for the security data and the public key to other blockchain nodes, so that each such blockchain node verifies the security data based on the digital signature and the public key, and stores the verified security data in the blockchain database for that blockchain node.

12. The medium of claim 11, wherein the instructions configured to cause the processor system to generate the digital signature based on the security data and the private key are further configured to cause the processor system to perform a hash calculation on a character string comprising the security data and the private key to obtain the digital signature.

13. The medium of claim 9, wherein the instructions configured to cause the processor system to obtain one or more pieces of security data of the IoT system from the blockchain database for the current blockchain node, and perform the corresponding operation on the IoT system based on the obtained security data are further configured to cause the processor system to:

obtain a security rule initially set by the gateway device from the blockchain database for the current blockchain node;

determine whether a local security rule of the gateway device is consistent with the obtained security rule;

responsive to the local security rule of the gateway device being consistent with the obtained security rule, determine that the local security rule of the gateway device has not been tampered with, so that the gateway device performs the corresponding operation on the IoT system according to the local security rule; and responsive to the local security rule of the gateway device being not consistent with the obtained security rule, determine that the local security rule of the gateway device has been tampered with, so that the gateway device performs the corresponding operation on the IoT system according to the obtained security rule.

14. The medium of claim 9, wherein:

the instructions configured to cause the processor system to send the security data of the IoT system to other blockchain nodes, so that each such blockchain node stores the security data in the blockchain database for that blockchain node are further configured to cause the processor system to send the security data together with identification information of the gateway device to other blockchain nodes, so that each such blockchain node stores the security data and the identification information of the gateway device in the blockchain database for that blockchain node; and the instructions configured to cause the processor system to obtain one or more pieces of security data of the IoT system from the blockchain database for a current blockchain node are further configured to cause the processor system to search for and read corresponding one or more pieces of security data of the identification information of the gateway device from the blockchain database for the current blockchain node according to the identification information of the gateway device.

15. The medium of claim 9, wherein:

the current blockchain node is the gateway device of the IoT system, and/or the gateway device of the IoT system is configured for performing at least one selected from: local monitoring of the IoT system, network protocol conversion of the IoT system, and/or edge computing of the IoT system.

* * * * *